(No Model.) 4 Sheets—Sheet 2.
L. G. YOUNGS & R. RICHARDSON.
CORN HARVESTER AND HUSKER.
No. 438,972. Patented Oct. 21, 1890.
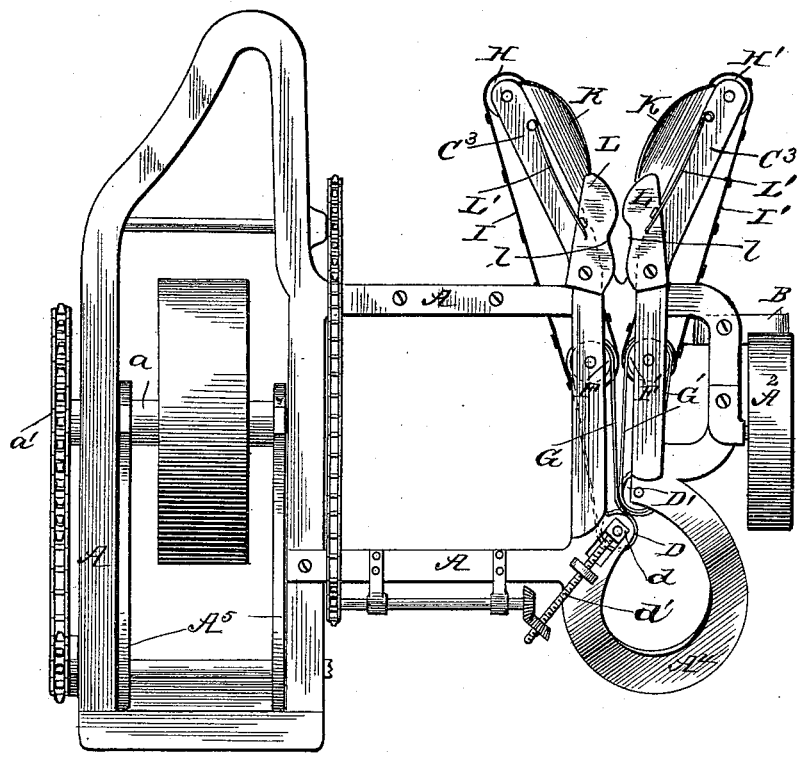
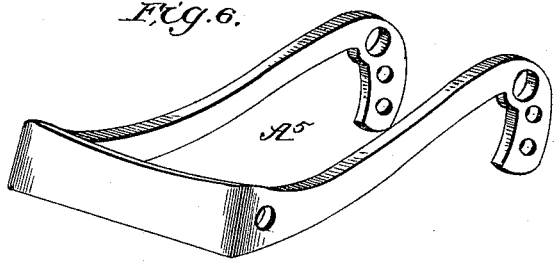
WITNESSES:
Fred G. Dieterich
Jos. A. Ryan
INVENTOR:
Leonard G. Youngs.
Reuben Richardson.
BY Munn & Co
ATTORNEYS (No Model.) 4 Sheets—Sheet 3.
L. G. YOUNGS & R. RICHARDSON.
CORN HARVESTER AND HUSKER.
No. 438,972. Patented Oct. 21, 1890.
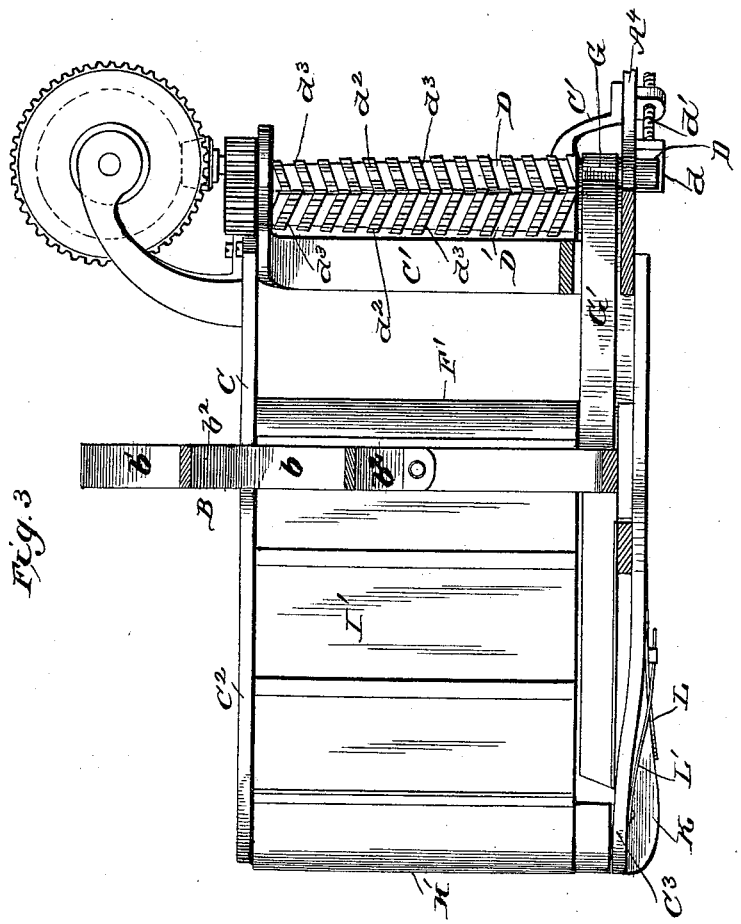
WITNESSES:
Fred G. Dieterich
Jos. A. Ryan
INVENTOR:
Leonard G. Youngs
Reuben Richardson
BY
ATTORNEYS

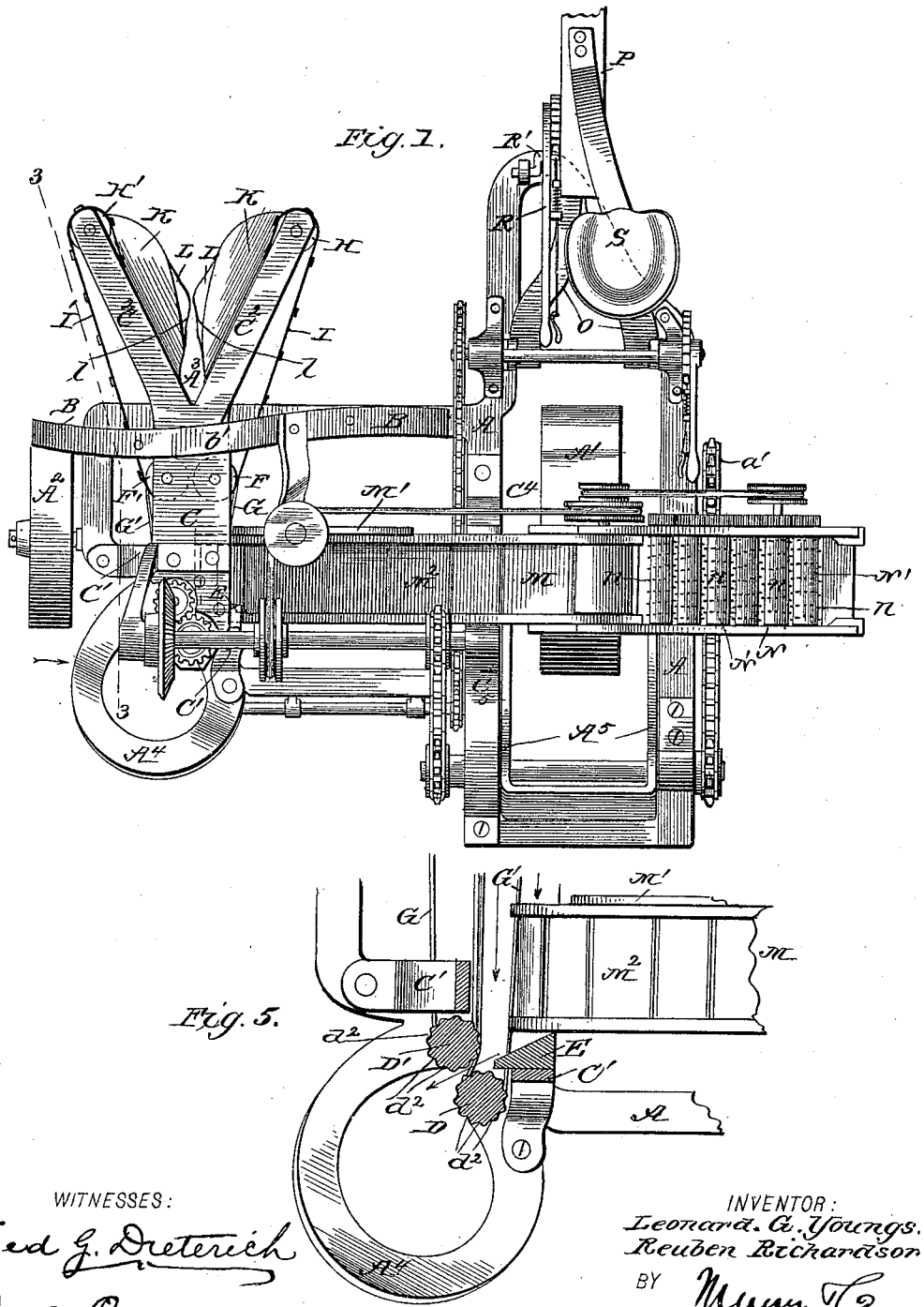

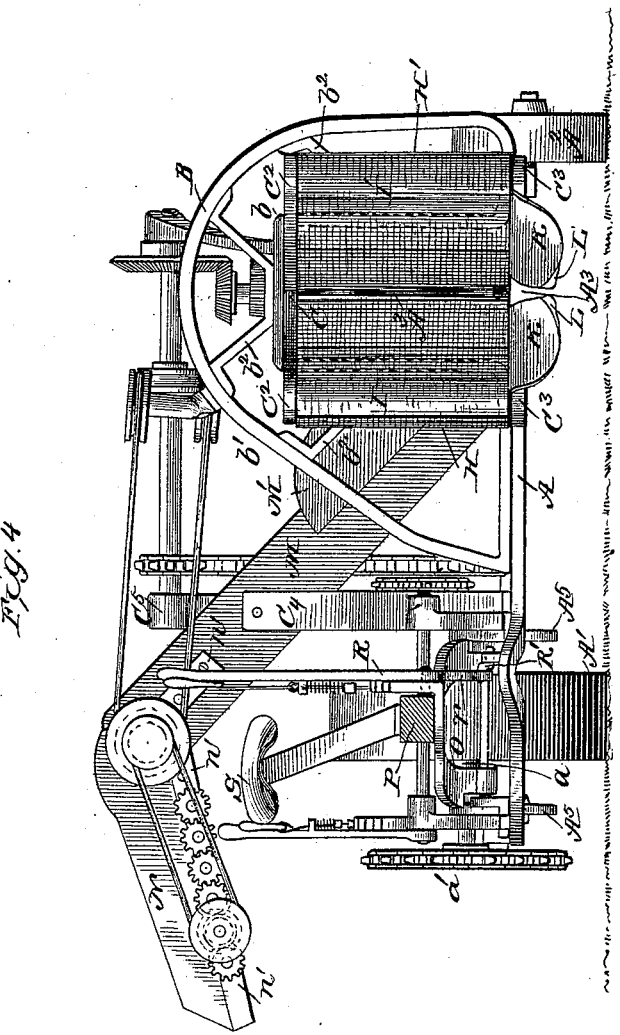

UNITED STATES PATENT OFFICE.

LEONARD G. YOUNGS AND REUBEN RICHARDSON, OF GRANT PARK, ILLINOIS.

CORN HARVESTER AND HUSKER.

SPECIFICATION forming part of Letters Patent No. 438,972, dated October 21, 1890.

Application filed May 9, 1890. Serial No. 351,192. (No model.)

*To all whom it may concern:*

Be it known that we, LEONARD G. YOUNGS and REUBEN RICHARDSON, of Grant Park, in the county of Kankakee and State of Illinois, have invented a new and useful Improvement in a Combined Corn Harvester and Husker, of which the following is a specification.

Our invention relates particularly to a combined corn harvester and husker in which the ears of corn are first husked in the field while the stalks are standing and then carried to a cleaning chute or trough and discharged into a wagon driven alongside the harvester.

The object of our invention is to provide a simple machine which will quickly and conveniently husk the ears from every stalk, imitating the actions of hand-husking, deliver the ears to a cleaning-trough, and discharge them into a wagon.

A further object is to produce a machine that will raise the broken down and bent stalks, guide them into the interior of the machine, and there give them a positive feed to the husking-rolls; and a still further object is to provide a novel construction of various parts, whereby the machine is rendered simple, more durable, and more efficient in its operation.

With these objects in view our invention consists, essentially, of a strong-wheeled frame carrying a pair of spirally and longitudinally grooved husking-rolls, mechanisms for gathering, guiding, clasping, and feeding the stalks properly to the said rolls, a stationary breaking-bar against which the ears strike when drawn between the rolls, thus releasing the ear from the husk-elevator and cleaning-chute for collecting, cleaning, and delivering the ears of corn, and mechanism, substantially as shown, for imparting the requisite motion to the various parts.

Our invention consists, further, in providing certain novel constructions of parts and combinations of the same, whereby the various objects are accomplished, such as will be more fully hereinafter explained.

In the accompanying drawings, forming a part of this specification, and in which similar letters of reference indicate the same parts, Figure 1 is a top plan view of our improved machine. Fig. 2 is a bottom plan view. Fig. 3 is a sectional view taken on the plane of the line 3 3 of Fig. 1. Fig. 4 is a front elevation. Fig. 5 is a horizontal section showing the husking-rolls and breaking-bar, and Fig. 6 is a detail view of the adjustable supplemental frame.

In the embodiment of our invention we employ a strong horizontal frame A, supported upon the traction and drive wheel $A'$, journaled within the frame near one side, and the wheel $A^2$, arranged upon the opposite side of the said frame. The draft is applied in line with the wheel $A'$, and near the opposite side the frame is constructed with a passage $A^3$ for the passage of the standing stalks. The portions of the frame separated by the said passage are united at the rear by means of the brace or loop $A^4$, said brace being essentially circular in shape, as shown, and at its rear side is given an upward curve.

By having the brace made circular in shape there is formed a sufficient space at the rear of the passage for the escape of the stalks without any possibility of throwing them back into the machine, and by giving said brace an upward curve it is greatly strengthened, as any attempt to spring or spread said loop would be resisted by the inherent elasticity of the brace and also by a torsional strain. It will therefore be seen that a frame having its parts connected by a brace or loop of the above description will be very strong and not liable to spring or become disconnected.

An arch B is secured to the frame A at the forward end of the passage $A^3$, spanning said passage and also serving as a connection between the portions of the frame separated by said passage. The arch proper is composed of the inner arch $b$, outer arch $b'$, and the braces $b^2$, connecting the said inner and outer portions. The inner arch is of a height sufficient to permit the free passage beneath the same of standing stalks of corn, and being connected with an outer arch in the manner described is better adapted to perform its functions, which will appear farther on.

A bearing-plate C is secured to the under side of the horizontal member of the inner arch $b$, said plate extending rearward the full length of the stalk-passage, and at its rear end is supported by means of the uprights $C'$, rigidly secured to the separate sections of the frame A.

The husking-rolls D D' are journaled between the rear end of the bearing-plate C and the separate sections of the frame, the roll D being journaled in the section adjacent to the drive-wheel and the roll D' in the opposite section, thus placing the rolls upon opposite sides of the stalk-passage. The lower end of the axis of roll D passes through a slot in the frame and is journaled in an adjustable bearing $d$, said bearing being adjusted by means of a screw $d'$, working in said bearing, and being operated by the driver through the medium of the lever, chains, and gears, arranged as shown in the accompanying drawings, whereby at any desired moment the operator can instantly vary the distance between the bottom of the rolls, according to the size of stalks upon which the machine is about to operate.

The husking-rolls D and D' are so arranged that they are a small distance apart at their lower extremities and are almost in contact at their upper extremities, but at no place are they sufficiently distanced to permit the passage of an ear of corn between the same. The rolls are grooved or serrated longitudinally their entire height, as at $d^2$, whereby a more positive feed and grasp of the stalk is insured, and each roll is also provided with a spiral groove $d^3$, extending a number of times around the rolls and also their entire height, thus forming in connection with the longitudinal grooves or serrations a series of spirally-arranged gripping-teeth. The spiral grooves on the rolls run in reverse directions, and when once started in mesh or coincidence will continue to move in such relative positions.

By arranging and constructing the rolls as described the differences in size between the different stalks will be compensated for and no additional force will be expended in crushing the larger stalks to the dimensions of the smaller ones, as each stalk coming in contact with the rolls will be carried upward by the spiral teeth or projections until it reaches a point at which the space between the rolls is small enough to bring the teeth firmly upon the stalk, when it will be carried or drawn through between the rolls until the butt of the ear comes in contact with the rolls, which, having a firm hold upon the stem of the husk, pulls it from the cob, and the ear drops or is forced out of the husk in a manner hereinafter explained. The husking-rolls D D' are preferably arranged with the roll D' slightly in advance of the roll D, thus placing the line drawn through their journals at an acute angle to the line of draft.

A stationary breaking-bar E, which assists the rolls in their husking operations, is rigidly secured between the bearing-plate C and the frame A, adjacent to and slightly in advance of the roll D, the rear face being on a line with the forward face of said roll. Without the bar E the ear of corn would go to the rolls at a right angle to the line drawn through their journals; but by employing the breaking-bar and arranging it as described the ear is deflected in its passage to the rolls, so that its stem enters at an oblique angle to the line passing through said journals, and as the stem is drawn between the rolls with considerable force the butt-end of the ear strikes the forward roll D' on its line of travel, when it is thrown toward the opposite roll or at a right angle to the rolls, and in being so thrown it strikes with considerable force upon the breaking-bar E, and as the stem is held securely between the rolls, and the butt-end of the ear is against the rolls, the moment it strikes the breaking-bar the stem is severed from the cob and the ear drops out of the husk, thus completing the operation of husking while the husk attached to the stalk is fed out at the rear of the rolls. The lower ends of the rolls D D' are reduced. Vertical rollers F F' are journaled between the plate C and frame A, just to the rear of the juncture of said plate and the arch B, one roller upon each side of the stalk-passage $A^3$, and belts G G' are arranged to pass, respectively, around the lower ends of the rolls D and F and D' and F'.

To the forward end of the bearing-plate are attached the diverging members $C^2$, and secured to the frame, upon opposite sides of the stalk-passages, are the rods or bars $C^3$, said bars diverging similar to the member $C^2$, being in parallel relation and vertical alignment with said member, and between the forward or outer ends of the said parts $C^2$ and $C^3$ are journaled the vertical rollers H and H', and passing around the rollers H and F is the guiding-apron I, while around the rollers H' and F' passes the guiding-apron I'. The guiding-aprons are each provided with a series of vertical cleats or slats, which assist in collecting and guiding the stalks to the interior of the machine.

The belts G and G' derive their motion from the husking-rolls D and D', and, passing forward, impart motion to the apron-rolls F F', thereby serving a double purpose of guiding the stalks to the husking-rolls and driving the guiding-apron.

Gathering-plates K K are rigidly secured to the inner sides of the bars $C^3$, said plates extending the entire length of said bars, and also extend inwardly and downwardly between said bars, the said gathering-plates being larger at their forward or outer ends and are therefore given more of a curve at those points, thus forming a divided scoop to gather up the stalks that are broken down and guide them up between the aprons I I'.

Beneath the gathering-plates K K, at the rear portion of the same, are arranged the clasping-jaws L L, one upon each gathering-plate, said clasping-jaws being pivoted at their rear ends, and at their forward end are connected with the springs L' L', secured to the forward ends of the bars $C^3$, which springs are adapted to hold the clasping-jaws in place.

The clasping-jaws have curved forward ends which meet or nearly meet, and at the rear of said curved portions said jaws are cut away, as at $l$, a sufficient distance to allow the movement of a stalk that has passed the forward curved portions. The object of said jaws L is to assist in raising broken-down stalks, the spring permitting the jaws to be forced apart; but when a stalk has once passed the curved portion and entered the cut-away part $l$ the jaws spring back into place. The jaws are intended to run very close to the ground. An elevator or conveyer M is arranged upon the inner side of the stalk-passage adjacent to the husking-rolls and stationary breaking-bar, the lower end of said elevator extending beneath the frame as far as the adjacent side of the passage. One or more fenders M' are attached to the elevator near its lower end to prevent any of the ears dropping out of said elevator. The elevator is provided with the usual endless carrier $M^2$ or any other suitable elevating mechanism. The elevator is supported at its outer and upper end at a suitable inclination upon the uprights $C^4$ and $C^5$, attached to the frame A. The ears of corn are carried from the husking-rolls up the elevator M, and may be discharged in any manner; but it is preferred to discharge the ears into a cleaning chute or trough N, connected to the upper end of the elevator M, and after passing through said cleaning chute or trough to discharge them into a wagon driven alongside the combined harvester and husker. The bottom of the cleaning-trough N consists of a series of rollers N', arranged in pairs, and all connected by suitable gears, each pair of rollers revolving in opposite directions, and each roller being provided with a series of teeth $n$, whereby the ears in passing over said rollers are freed of all dirt, seeds, cockle-burrs, broken weeds, and other foreign matter. The cleaning-spout is braced by means of the braces $n'$, connected with the elevator M, and may be given any desired inclination, as can also the elevator M.

A casting or frame O is pivoted at its rear end to the forward end of the frame A directly in front of the drive-wheel A', and to said casting or frame O is secured the draft-pole P and also the driver's seat S. Upon one side of the draft-pole is arranged a hand-lever R, having an angled end $r$, to which is connected the link-arm R', by means of which the forward end of the frame A and entire machine may be raised and lowered, as desired, said lever being provided with the usual rack-bar and spring-actuated engaging-pawl. Upon the opposite side of the draft-pole is arranged the lever for operating the adjusting mechanism of the bearing of the husking-roll D, as already described.

The drive-wheel A' may be journaled in the frame proper or in a supplemental frame $A^5$, pivoted at its rear end to the rear end of the frame and carrying the wheel-axle $a$ between its forward ends, said forward ends being extended downward and provided with a series of apertures, as shown, whereby the said wheel may be raised or lowered, as desired.

The axle $a$ of the drive-wheel A' has secured upon it a sprocket-wheel $a'$, by means of which motion is transmitted to the various parts of the mechanism by means of the various mechanical contrivances shown in the accompanying drawings, and it is obvious that we may employ other devices for transmitting motion without departing from the spirit of our invention, as these are matters falling in the domain of the mechanic, rather than that of the inventor.

The operation of our device having been fully described in connection with the description of its construction is plain to every one and needs no further description here.

Having thus described our invention, what we claim is—

1. In a machine of the character described, the combination, with a main frame having a stalk-passage dividing said frame into two sections, of a brace or loop essentially circular in shape and curved upwardly at its rear side, connecting said sections at the rear of the stalk-passage, substantially as shown and described.

2. In a machine of the character described, the combination, with a main frame having a stalk-passage dividing said frame into two sections, of a brace or loop essentially circular in shape and curved upwardly at its rear side, connecting the sections of said frame at the rear end of the stalk-passage, and an arch spanning the forward end of the stalk-passage and connecting the sections of the frame at that point, substantially as shown and described.

3. In a machine of the character described, the combination, with the frame having the stalk-passage, of the husking-rolls arranged one on each side of the stalk-passage, said rolls being arranged at an acute angle to the line of draft, and a breaking-bar arranged adjacent to and in advance of the rearward roll, substantially as and for the purpose set forth.

4. In a machine of the character described, the combination, with a main frame having a stalk-passage, of husking-rolls upwardly converging, arranged one upon each side of said passage and at an acute angle to the line of draft, a stationary breaking-bar arranged adjacent to and in advance of the rearmost roll, and devices, substantially as shown, connected with the lower end of said rearmost roll, whereby the degree of convergency of the husking-rolls can be instantly changed, substantially as shown and described.

5. In a machine of the character described, the combination, with the main frame provided with a stalk-passage, of the upwardly-converging laterally-adjustable longitudinally and spirally grooved husking-rolls, one upon each side of the stalk-passage, and arranged at an acute angle to the line of draft, the stationary breaking-bar arranged adjacent to and in advance of the rear roll, and devices, substantially as shown, connected with the lower end of said rear roll, whereby the degree of convergency between the husking-rolls can be instantly changed while the machine is in operation, substantially as and for the purpose described.

6. In a machine of the character described, the combination, with a main frame having a stalk-passage, of the husking-rolls arranged near the rear end of said passage upon each side of the same, belts passing around the lower ends of the husking-rolls and the rollers adjacent thereto, said belts running in the stalk-passage to feed the stalks to the husking-rolls, and devices, substantially as shown, connected with the lower end of one of the husking-rolls to vary the distance between the lower ends of said rolls and also of the belts, substantially as and for the purpose described.

7. In a machine of the character described, the combination, with a main frame having a stalk-passage, of the vertical guiding endless aprons extending divergently forward from the forward end of said passage, the feeding-belts arranged at the rear of the vertical aprons and operating the same, and the husking-rolls operating the feeding-belts, substantially as shown and described.

8. In a machine of the character described, the combination, with a main frame having a stalk-passage, of the endless vertical guiding-aprons arranged at the forward end of said passage, the belts arranged to the rear of said aprons and operating the same, the husking-rolls operating the belts and arranged at an acute angle to the line of draft, and the breaking-bar arranged adjacent to and in advance of the rearmost roll, substantially as and for the purpose described.

9. In a machine of the character described, the combination, with a main frame having a stalk-passage, of the upwardly-converging husking-rolls arranged upon each side of the same and at an acute angle to the line of draft, the stationary breaking-bar arranged adjacent to and in advance of the rear roll, the rear face of said bar being in alignment with the forward face of its adjacent roll, the belts around the lower ends of the husking-rolls and running in the stalk-passage, the forward extending and diverging endless vertical guiding-aprons, said belts operating the said aprons, and the devices connected with the lower end of the rear roll to regulate the degree of convergency of the rolls and the distance between the belts, substantially as and for the purpose described.

10. In a machine of the character described, the combination, with a main frame having a stalk-passage, of an arch spanning said passage at its forward end, the bearing-plate secured to said arch and extending rearward the entire length of the passage, and the husking-rolls adjustably journaled between the rear end of the bearing-plate and the main frame, substantially as shown and described.

11. In a machine of the character described, the combination, with a main frame having a stalk-passage, of an arch, constructed as described, spanning said passage at its forward end, a bearing-plate secured to said arch and extending rearward the entire length of the stalk-passage, the husking-rolls journaled one upon each side of said passage and between the main frame and the bearing-plate, said rolls being arranged at an acute angle to the line of draft, and the stationary breaking-bar secured between the main frame and bearing-plate adjacent to and in advance of the rearmost roll, substantially as and for the purpose described.

12. In a machine of the character described, the combination, with a main frame having a stalk-passage, of the spring clasping-jaws pivoted to the main frame at the forward end of said passage and beneath the same, having enlarged and curved forward portions and recessed rear parts, and springs for pressing said jaws together, substantially as and for the purpose described.

13. In a machine of the character described, the combination, with a main frame having a stalk-passage, of the forwardly-extending outwardly-diverging inwardly and downwardly converging gathering-plates, and the spring-actuated clasping-jaws, curved at their forward ends and recessed at the rear to assist the gathering-plates in picking up, guiding, and holding the broken-down stalks, substantially as shown and described.

LEONARD G. YOUNGS.
REUBEN RICHARDSON.

Witnesses:
WILLIAM L. HATTON,
JOSEPH CLAIDT.